(12) United States Patent
Takeda et al.

(10) Patent No.: US 10,404,104 B2
(45) Date of Patent: Sep. 3, 2019

(54) WIRELESS POWER SUPPLY APPARATUS

(71) Applicants: DENSO WAVE INCORPORATED, Chita-gun, Aichi-pref. (JP); DENSO CORPORATION, Kariya, Aichi-pref. (JP)

(72) Inventors: Shigeru Takeda, Okazaki (JP); Masayoshi Sugino, Anjo (JP); Hiroshi Kondo, Nagoya (JP)

(73) Assignees: DENSO WAVE INCORPORATED, Aichi-Pref. (JP); DENSO CORPORATION, Kariya (JP)

( * ) Notice: Subject to any disclaimer, the term of this patent is extended or adjusted under 35 U.S.C. 154(b) by 151 days.

(21) Appl. No.: 14/671,374

(22) Filed: Mar. 27, 2015

(65) Prior Publication Data

US 2015/0280451 A1 Oct. 1, 2015

(30) Foreign Application Priority Data

Mar. 28, 2014 (JP) .................................. 2014-068790

(51) Int. Cl.
*H02J 7/02* (2016.01)
*H02J 50/12* (2016.01)
(Continued)

(52) U.S. Cl.
CPC .............. *H02J 50/40* (2016.02); *H02J 7/025* (2013.01); *H02J 17/00* (2013.01); *H02J 50/12* (2016.02)

(58) Field of Classification Search
CPC . H01F 38/14; H02J 5/005; H02J 7/025; H02J 17/00; H02J 50/12; H04B 5/0037; H04B 5/0075
(Continued)

(56) References Cited

U.S. PATENT DOCUMENTS 6,301,128 B1 * 10/2001 Jang .................. H02J 5/005
363/127
9,318,897 B2 * 4/2016 Brohlin .................. H02J 5/005
(Continued)

FOREIGN PATENT DOCUMENTS

CN 103329398 A 9/2013

OTHER PUBLICATIONS

Watanabe et al., "Bidirectional Contactless Power Transfer Systems expandable from Unidirectional Systems", IEE, 2012, pp. 343-344, Japan.

*Primary Examiner* — Levi Gannon
(74) *Attorney, Agent, or Firm* — Oliff PLC

(57) ABSTRACT

In a wireless power supply apparatus, a first unit electrically connected to a power supply and a second unit electrically connected to an electric load. Power transmission is performed wirelessly between the first and second units using a magnetic resonance phenomenon. Each of the units has a resonant amplifier circuit provided with switching means driven by a drive signal, a resonant coil to which a high-frequency signal generated by the resonant amplifier circuit is supplied such that the resonant coil functions as a resonant inductor on the resonant amplifier circuit, and electric storage means electrically connected to the resonant amplifier circuit so as to be capable of charging and discharging power. The second unit includes current detecting means for detecting a current flowing through the storage means, and phase control means for controlling a phase of the drive signal for the switching means based on the detected current.

3 Claims, 10 Drawing Sheets

(51) Int. Cl.
*H02J 50/40* (2016.01)
*H02J 17/00* (2006.01)

(58) Field of Classification Search
USPC .......................................... 307/104
See application file for complete search history.

(56) References Cited

U.S. PATENT DOCUMENTS

| | | | |
|---|---|---|---|
| 2002/0149890 A1* | 10/2002 | Kaneko | H02M 7/5233 361/18 |
| 2009/0003022 A1* | 1/2009 | Nunoya | B60L 5/005 363/78 |
| 2010/0109443 A1* | 5/2010 | Cook | H01Q 1/2225 307/104 |
| 2011/0254379 A1 | 10/2011 | Madawala | |
| 2012/0261998 A1 | 10/2012 | Sato | |
| 2013/0159956 A1* | 6/2013 | Verghese | G06F 17/5036 716/122 |
| 2013/0300210 A1 | 11/2013 | Hosotani | |
| 2015/0188319 A1 | 7/2015 | Iwawaki | |
| 2015/0207333 A1* | 7/2015 | Baarman | H02J 17/00 307/104 |
| 2015/0207335 A1 | 7/2015 | Madawala et al. | |
| 2015/0229132 A1* | 8/2015 | Katsunaga | B60L 11/182 307/104 |
| 2015/0280455 A1* | 10/2015 | Bosshard | H02J 5/005 307/104 |
| 2015/0303703 A1* | 10/2015 | Hayashi | H02J 5/005 307/104 |
| 2015/0341087 A1* | 11/2015 | Moore | H04B 5/0031 455/77 |
| 2016/0056664 A1* | 2/2016 | Partovi | H02J 7/025 307/104 |
| 2017/0018973 A1* | 1/2017 | Murayama | H02J 17/00 |

\* cited by examiner

WIRELESS POWER SUPPLY APPARATUS

CROSS-REFERENCE TO RELATED APPLICATION

This application is based on and claims the benefit of priority from earlier Japanese Patent Application No. 2014-068790 filed Mar. 28, 2014 the description of which are incorporated herein by reference.

BACKGROUND OF THE INVENTION

Field of the Invention

The present invention relates to a wireless power supply apparatus that supplies power wirelessly.

Description of the Related Art

Conventionally, there has been a need for further reduction of energy consumption in production equipment. In the case of production equipment that uses robots, wireless power supply is being considered to reduce wiring and the like, and to promote space-saving. In such production equipment, energy consumption in the overall production equipment can be reduced by interchanging power among loads, such as robots. In other words, a load, such as a robot, consumes energy, such as electrical power, during acceleration and conversely, generates energy during deceleration. As a result of the energy generated during deceleration being changed to electrical power and the power being consumed by another load, such as another robot, energy consumption in the overall production equipment can be reduced.

As a technique for wirelessly supplying power, a technique has been proposed in which power is interchanged bi-directionally between a power supply side and a load side (refer to Heisei 24 The Institute of Electrical Engineers of Japan Zenkoku Taikai 4-203). The premise of this technique is vehicles, such as electric cars. Therefore, wireless interchange of power is performed between the power supply side and the load side, using electromagnetic induction with a frequency band of 100 kHz or lower.

However, when the frequency band is 100 kHz or lower, a problem occurs in that the physical structure of a coil becomes larger to enable sufficient power can be supplied. In the case of a vehicle, limitation is minimal even when a physically large coil is used because the vehicle itself is sufficiently large. However, in the case of a robot in production equipment, interchange of power using a smaller coil is desired. In other words, when a large and heavy coil is used in a robot, a problem occurs in that the weight of the robot itself increases, a driving apparatus becomes larger in accompaniment with the increase in weight, and the equipment itself becomes larger.

However, to perform wireless power supply using a small coil, power supply in the megahertz frequency band is required. In a high-frequency band such as this, a problem occurs in that switching loss and the like occur when electromagnetic induction is used.

SUMMARY

Therefore, it is desired to provide a wireless power supply apparatus that is high in safety and in which size reduction and improvement in transmission efficiency has been achieved by wireless supply of power using a high-frequency band.

In an exemplary embodiment, a first unit that is connected to a power supply side and a second unit that is connected to a load side are provided. Between the pair of the first unit and the second unit, power is wirelessly transmitted with a high frequency from several megahertz to about a dozen megahertz using magnetic resonance. In other words, power is transmitted between the first unit and the second unit by wireless power supply at a high-frequency band using magnetic resonance. Therefore, size increase of the resonant coils can be avoided, and size reduction of peripheral equipment can be achieved as well. In addition, through wireless power supply using magnetic resonance, transmission efficiency in wireless power supply over a longer distance can be increased, compared to electromagnetic induction.

In addition, in the exemplary embodiment, a phase control means of the second unit controls the driving phase of a switching means that is provided on a resonant amplifier circuit, based on a current detected by a current detecting means. The size of power transmitted between the first unit and the second unit changes based on the phase difference in the resonating high frequencies. In other words, power transmission efficiency changes depending on the phase difference in the resonating high frequencies between the first unit and the second unit. Therefore, in the invention according to the exemplary embodiment, the current flowing to an electric storage means of the second unit is detected by the current detecting unit. The phase control means then controls the driving phase of the switching means on the resonant amplifier circuit of the second unit based on the detected current. As a result, a difference in the phases of the transmitted high frequencies is produced between the first unit and the second unit. Therefore, regarding the power transmitted between the first unit and the second unit, transmission efficiency is controlled simply by controlling the driving phase in the switching means of the second unit, while maintaining the phase of the high-frequency signal oscillated from the first unit. In other words, by controlling the driving phase in the switching means of the second unit, the phase difference in the high frequencies between the first unit and the second unit is controlled while maintaining the phase in the first unit. As a result, the transmission efficiency of power transmitted between the first unit and the second unit can be easily controlled. Therefore, size reduction and improvement in transmission efficiency can be achieved with a simple structure by controlling the phase difference between the first unit and the second unit.

Meanwhile, in the exemplary embodiment, when phase difference occurs between the first unit and the second unit, the phase difference merely causes increase in impedance in the resonant coil of the first unit or the second unit. In other words, even when a phase difference that causes significant reduction in transmission efficiency occurs, all that occurs is an increase in electrical resistance in the resonant amplifier circuit of the first unit or the second unit, and unintended flow of current and flow of excessive current do not occur. Therefore, even when large power is transmitted between the first unit and the second unit, safety can be improved. As a result, the invention can be applied to equipment, such as robots, in which safety is important.

Furthermore, in the exemplary embodiment, the resonant coils of the first unit and the second unit both function as resonant inductors in the resonant amplifier circuits. Therefore, resonant inductors are not required to be separately provided in the resonant amplifier circuits. Thus, simplification of circuit configuration can be achieved and size reduction of equipment can be promoted.

As described above, in the pair of the first unit and the second unit, the direction of power transmission between the first unit and the second unit, in addition to the power transmission efficiency between the first unit and the second unit, can be controlled by controlling the driving phase of the switching means on the second unit side. In other words, by controlling the phase difference between the first unit and the second unit, power transmission from the second unit to the first unit becomes possible, in addition to power transmission from the first unit to the second unit. The load connected to the second unit generates power by regeneration during braking.

In another exemplary embodiment, phase difference between the first unit and the second unit is produced by controlling the driving phase of the switching means, and the transmission direction is also controlled, in addition to the power transmission efficiency, by the phase difference. As a result of power generated by regeneration being transmitted from the second unit to the first unit, energy generated by the load connected to the second unit is transmitted to another load via the first unit. Therefore, power can be transmitted bi-directionally between the first unit and the second unit by a simple control operation in which the driving phase of the switching means in the second unit is controlled, and power consumption of the overall equipment can be reduced. As a result, the invention can be applied to equipment, such as robots, that require reduced size and reduced weight.

BRIEF DESCRIPTION OF THE DRAWINGS

In the accompanying drawings:

FIG. 9A and FIG. 9B are diagrams of a first unit in a wireless power supply apparatus according to a third embodiment, in which FIG. 9A is a schematic perspective view and FIG. 9B is a schematic diagram of the electrical configuration;

FIG. 10A and FIG. 10B are diagrams of a second unit in the wireless power supply apparatus according to the third embodiment, in which FIG. 10A is a schematic perspective view and FIG. 10B is a schematic diagram of the electrical configuration.

DETAILED DESCRIPTION OF THE PREFERRED EMBODIMENTS

A plurality of embodiments of a wireless power supply apparatus will hereinafter be described with reference to the drawings. Constituent sections that are essentially the same in the plurality of embodiments are given the same reference numbers. Descriptions thereof are omitted.

First Embodiment

Figure 1:
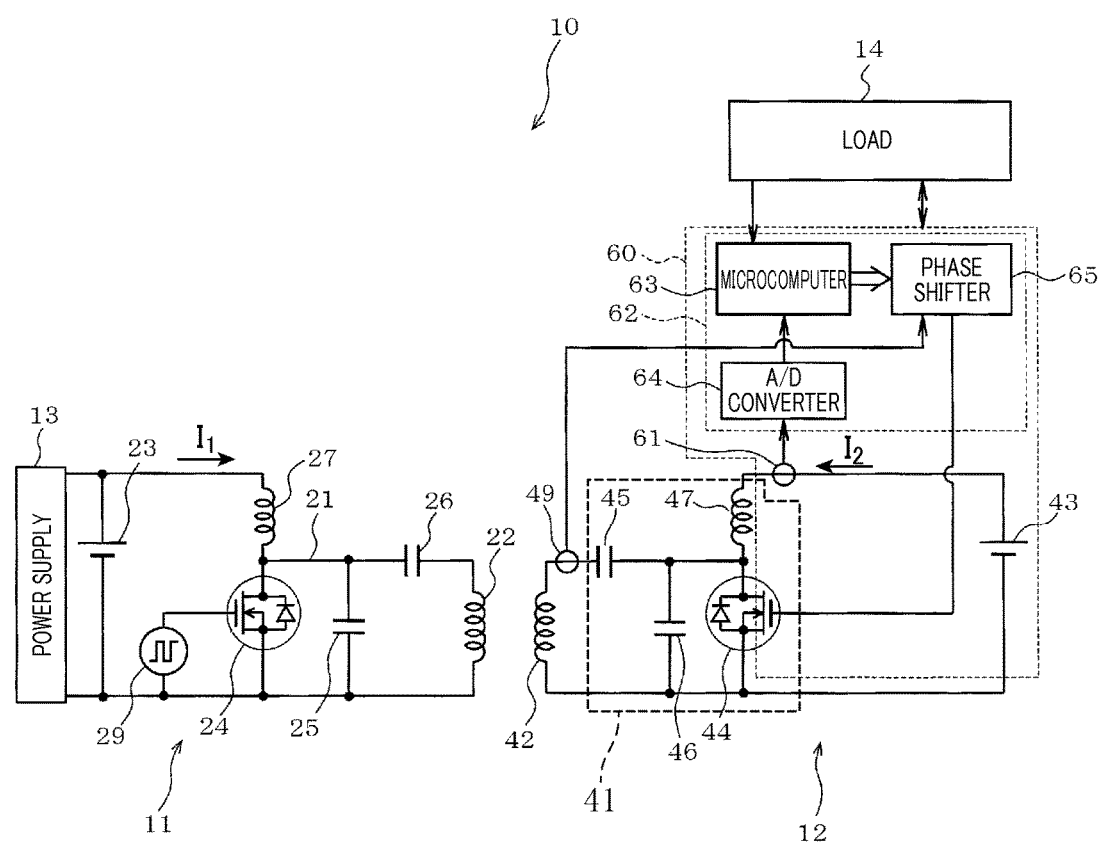
FIG. 1 is a schematic diagram of an electrical configuration of a wireless power supply apparatus according to a first embodiment.
Figure 2:
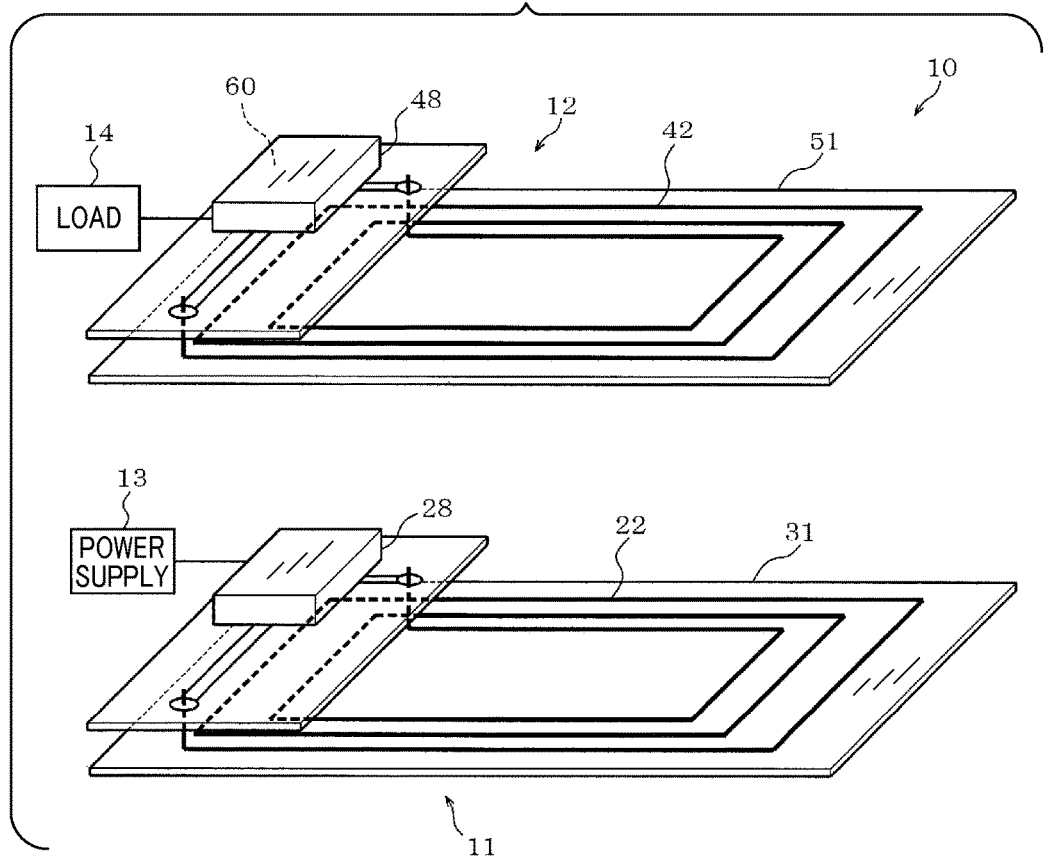
FIG. 2 is a schematic perspective view of the wireless power supply apparatus according to the first embodiment.

As shown in FIG. 1 and FIG. 2, a wireless power supply apparatus 10 according to a first embodiment includes a first unit 11 and a second unit 12. The first unit 11 is connected to an external power supply 13. The second unit 12 is provided so as to oppose the first unit 11 and is connected to a load 14, such as a robot, that consumes power. Power is wirelessly transmitted between the first unit 11 and the second unit 12 by magnetic resonance at a high frequency from several megahertz to about a dozen megahertz. The first unit 11 may also be connected to another load that consumes power, in addition to the power supply 13.

As shown in FIG. 1, the first unit 11 has a resonant amplifier circuit 21, a resonant coil 22, and an electric storage unit 23. The resonant amplifier circuit 21 has a switching element 24, a capacitor 25, a capacitor 26, and a coil 27. As shown in FIG. 2, the resonant amplifier circuit 21 and the electric storage unit 23 are mounted on an amplifier board unit 28. In addition, as shown in FIG. 1, the resonant amplifier circuit 21 has a clock generating unit 29 that generates a carrier clock (functioning as a switching signal) in the first unit 11. The switching element 24 performs switching of the resonant amplifier circuit 21 based on the carrier clock generated by the clock generating unit 29. The high-frequency signal that is generated by the switching operation is supplied to the resonant coil 22. As shown in FIG. 2, the resonant coil 22 is a planar coil that is formed on a substrate 31 that is separate from the amplifier board unit 28.

As shown in FIG. 1, the resonant coil 22 forms a resonant circuit together with the capacitor 25, the capacitor 26, and the coil 27. When power is transmitted from the first unit 11 to the second unit 12, or in other words, when power transmission is performed, the resonant coil 22 oscillates at the high frequency of the high-frequency signal that is generated in the resonant amplifier circuit 21. On the other hand, when power is transmitted from the second unit 12 to the first unit 11, or in other words, when power reception is performed, the resonant coil 22 receives the high-frequency signal oscillated in the second unit 12. The electric storage unit 23 is configured by a secondary battery, a capacitor, or the like and stabilizes the current flowing through the resonant amplifier circuit 21. In other words, the electric storage unit 23 functions as a power supply when power is transmitted from the first unit 11 to the second unit 12 and functions as a capacitor when power from the second unit 12 is received by the first unit 11. The resonant amplifier circuit 21 and the electric storage unit 23 are provided in the amplifier board unit 28 shown in FIG. 2.

As shown in FIG. 1, in a manner similar to the first unit 11, the second unit 12 has a resonant amplifier circuit 41, a resonant coil 42, and a storage unit 43. The resonant amplifier circuit 41 has a switching element 44, a capacitor 45, a capacitor 46, and a coil 47. As shown in FIG. 2, the resonant amplifier circuit 41 and the electric storage unit 43 are mounted on an amplifier board unit 48. The switching element 44 performs switching of the resonant amplifier circuit 41 based on a carrier clock (functioning as a phase signal) generated by a phase shifter 65, described hereafter. The high-frequency signal that is generated by the switching operation is supplied to the resonant coil 42.

When a high-frequency signal is oscillated in the first unit 11, resonance is generated in the resonant amplifier circuit 41 of the second unit 12 as a result of magnetic resonance, and the resonant amplifier circuit 41 of the second unit 12 generates a current as a result of the generated resonance. As shown in FIG. 2, the resonant coil 42 is a planar coil that is formed on a substrate 51 that is separate from the amplifier board unit 48. As shown in FIG. 1, the resonant coil 42 forms a resonant circuit together with the capacitor 45, the capacitor 46, and the coil 47. When power is transmitted from the first unit 11 to the second unit 12, or in other words, when power reception is performed, the resonant coil 42 receives the high-frequency signal oscillated in the first unit 11. On the other hand, when power is transmitted from the second unit 12 to the first unit 11, or in other words, when power transmission is performed, the resonant coil 42 oscillates at the high frequency of the high-frequency signal that is generated in the resonant amplifier circuit 41. The electric storage unit 43 is configured by a secondary battery, a capacitor, or the like and stabilizes the current flowing through the resonant amplifier circuit 41. In other words, the electric storage unit 43 functions as a power supply when power is transmitted from the second unit 12 to the first unit 11 and functions as a capacitor when power from the first unit 11 is received by the second unit 12. The resonant amplifier circuit 41 and the electric storage unit 43 are provided in the amplifier board unit 48 shown in FIG. 2.

In addition to, the foregoing, the second unit 12 includes a control unit 60. The control unit 60 is mounted in the amplifier board unit 48. As shown in FIG. 1, the control unit 60 has a current sensor 61 that serves as a current detecting means and a phase control unit 62. The current sensor 61 is provided in an electric circuit path connecting the resonant amplifier circuit 41 and the electric storage unit 43 and detects the size of the current I2 flowing through the electric circuit. The current sensor 61 also detects the direction of the current I2 as the size of the current. The phase control unit 62 has a current sensor 49, a microcomputer 63, an analog/digital (A/D) converter 64, and the phase shifter 65. The current sensor 49 detects a high-frequency current flowing through the resonant amplifier circuit 41 that serves as the basis for phase control. In other words, the current sensor 49 samples the current flowing through the resonant amplifier circuit 41.

Figure 3:
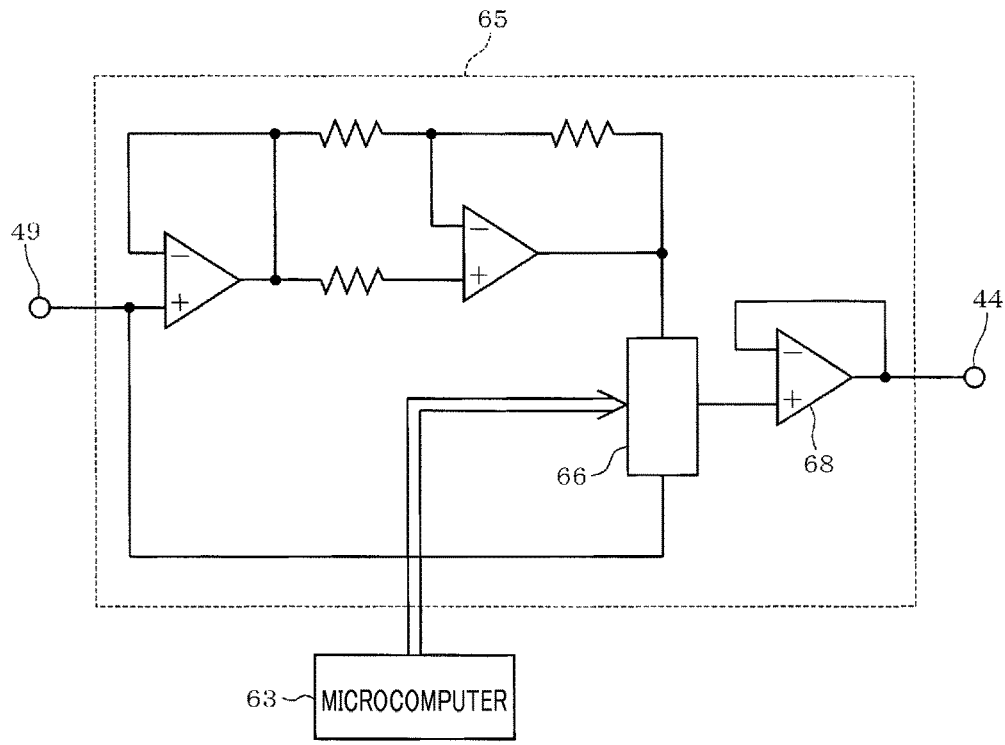
FIG. 3 is a schematic diagram of a configuration of a phase shifter in the wireless power supply apparatus according to the first embodiment.

The microcomputer 63 has a central processing unit (CPU), a read-only memory (RAM), and a random access memory (ROM) (not shown). The microcomputer 63 controls the phase control unit 62 and a digital potentiometer 66 of the phase shifter 65 based on a computer program stored in the ROM and controls the phase shift of the signal inputted from the current sensor 49. The A/D converter 64 converts an analog value of the current I2 detected by the current sensor 61 to a digital value and outputs the digital value to the microcomputer 63. As shown in FIG. 3, for example, the phase shifter 65 is composed of the digital potentiometer 66 and a voltage follower circuit 68. The microcomputer 63 controls the phase shift of the high-frequency signal inputted from the current sensor 49 using the phase shifter 65, based on the current I2 detected by the current sensor 61. As a result, the microcomputer 63 changes the value of the digital potentiometer 66 based on the current I2 detected by the current sensor 61, thereby changing the phase shift of the carrier clock generated by the phase shifter 65. Consequently, the driving phase of the carrier clock that drives the switching element 44 changes, and the phase of the high-frequency current flowing through the resonant amplifier circuit 41 of the second unit 21 is changed.

The clock generating unit 29 of the first unit 11 generates the carrier clock indicated by expression (1) below.

$$V1 = V \times \sin(2\pi f \times t) \quad (1)$$

Conversely, the phase shifter 65 of the second unit 12 generates a carrier clock indicated by expression (2) below.

$$V2 = V \times \sin(2\pi f \times t + \phi) \quad (2)$$

As indicated by expression (1) and expression (2), a phase difference corresponding to a phase ϕ occurs between the high-frequency signal oscillated from the first unit 11 and the high-frequency oscillated signal from the second unit 12. The phase control unit 62 controls the phase difference between the first unit 11 and the second unit 12 by changing the phase ϕ. An all-pass filter type of phase shifter is shown in FIG. 3 as an example of the phase shifter 65. However, the phase shifter 65 is not limited to this example as long as control is possible.

As described above, when the high-frequency magnetic resonance generated between the first unit 11 and the second unit 12, current I1 flows to the first unit 11 and current I2 flows to the second unit 12, as shown in FIG. 1. The current sensor 61 detects the current I2 flowing to the second unit 12.

Figure 4:
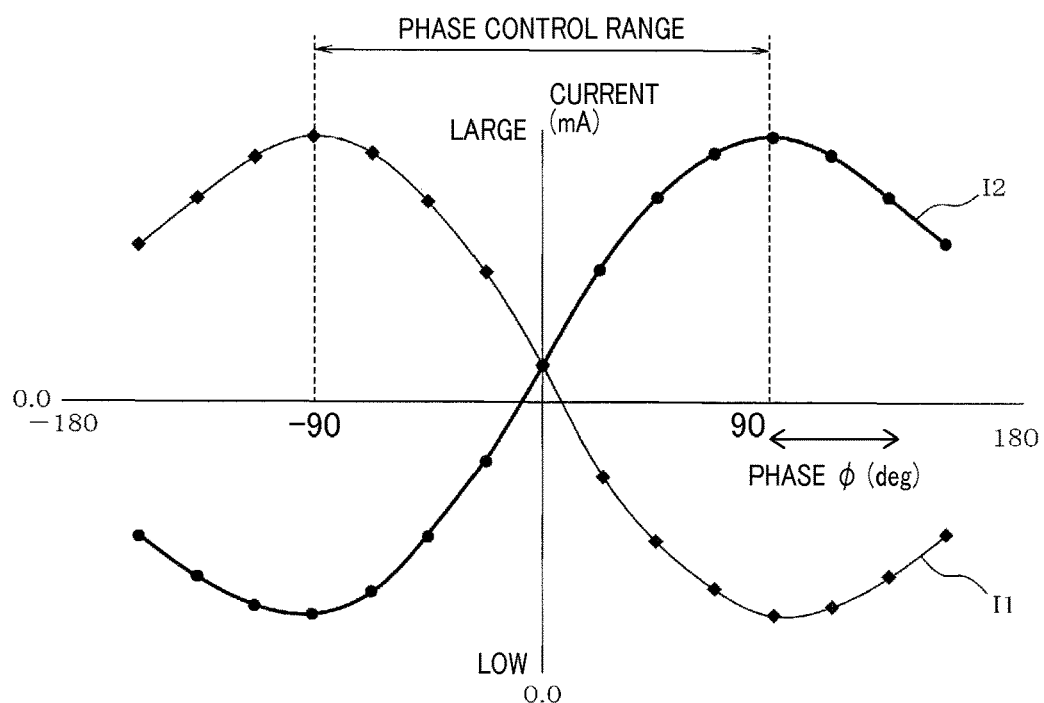
FIG. 4 is a schematic diagram of a relationship between current and phase difference between a first unit and a second unit in the wireless power supply apparatus according to the first embodiment.

As shown in FIG. 4, when a difference amounting to the phase ϕ occurs between the first unit 11 and the second unit 12, the sizes and the directions of the current I1 and the current I2 change. In other words, as a result of the difference of phase ϕ being controlled, the direction of power transmission between the first unit 11 and the second unit 12 changes, in addition to power transmission efficiency between the first unit 11 and the second unit 12. However, when the difference of phase ϕ becomes large, the transmitted power tends to become unstable. Therefore, according to the first embodiment, the phase ϕ is controlled within a range of $-90° \leq \phi \leq 90°$. In other words, according to the present embodiment, a phase control range for controlling the phase ϕ is set to $-90° \leq \phi \leq 90°$. The phase control range is an example and can be arbitrarily set depending on the specifications, characteristics, and the like of the first unit 11 and the second unit 12.

The high-frequency signal oscillated in the first unit 12 and the second unit 12 is set from several megahertz to about a dozen megahertz. Here, when the inductance of the resonant coil 22 and the resonant coil 42 is Lreso, the output impedance of the first unit 11 and the second unit 12 is RL, the Q value of the resonant circuits in the first unit 11 and the second unit 12 is QL, and the frequency of the carrier clock is fd, the inductance Lreso is calculated by expression (3) below.

$$Lreso = (QL \times RL)/(2\pi fd) \quad (3)$$

Based on expression (3) above, the inductance Lreso decreases as the frequency of the high-frequency signal oscillated in the first unit 11 and the second unit 12 increases. As a result, according to the present embodiment in which the frequency of the high-frequency oscillated signal is high, noise that is externally emitted is reduced and effects on external equipment, such as a robot serving as a load, are reduced.

Figure 5:
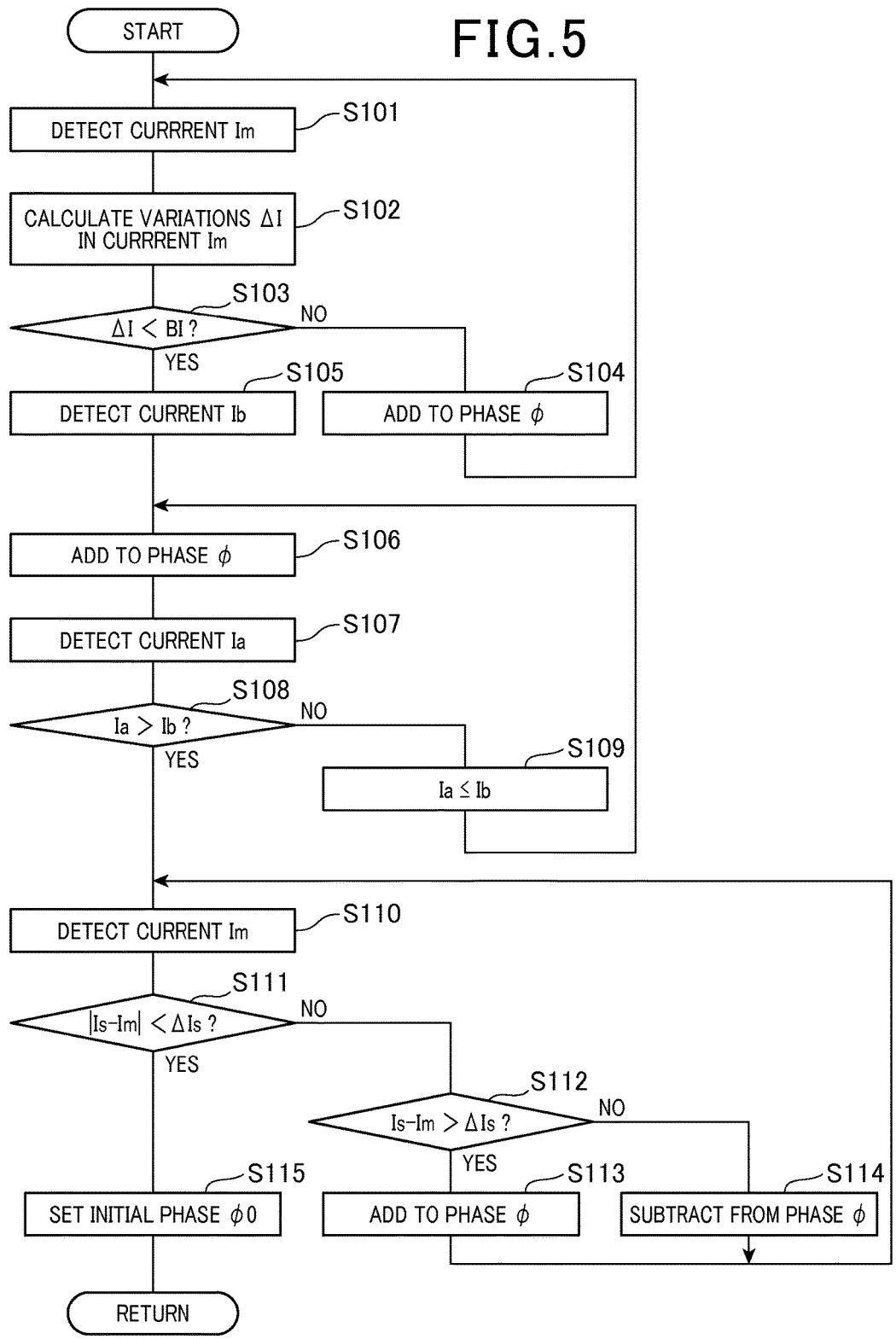
FIG. 5 is a schematic diagram of the flow of an initialization process in the wireless power supply apparatus according to the first embodiment.
Figure 6:
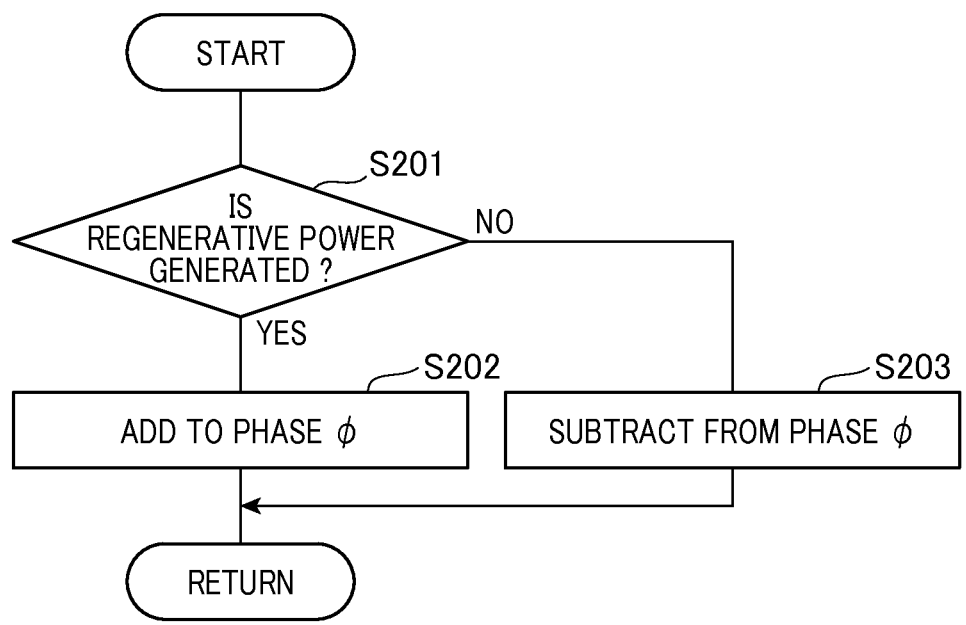
FIG. 6 is a schematic diagram of the flow of a process performed during power transmission in the wireless power supply apparatus according to the first embodiment.

Next, the flow of phase control in the wireless power supply apparatus 10, configured as described above, will be described with reference to FIG. 5 and FIG. 6.

(Initialization)

Oscillation characteristics of the high-frequency signal differ between the first unit 11 and the second unit 12 of the wireless power supply apparatus 10 as a result of individual differences and the like. In other words, the phase difference between the first unit 11 and the second unit 12 may depart from the phase control range as a result of individual differences in the power supply and loads that are connected, as well as in the first unit 11 and the second unit 12 themselves. Therefore, at startup of the wireless power supply apparatus 10, an initialization process is first performed. The initialization process is performed by the control unit 60.

When initialization is started, the microcomputer 63 of the control unit 60 detects, from the current sensor 61 via the A/D converter 64, an current value Im of the current I2 that is flowing through the resonant amplifier circuit 41 of the second unit 12 (step S101). The control unit 60 detects the current Im until the elapse of a certain period set in advance. The control unit 60 then calculates variation ΔI in the detected current Im based on the current Im detected over the set certain period (S102). The variation ΔI is calculated by, for example, the difference between the maximum value and the minimum value of the detected current. After calculating the variation ΔI in the current Im at S102, the control unit 60 determines whether or not the calculated variation ΔI is lower than a threshold BI (S103). The threshold BI is arbitrarily set depending on the characteristics of the wireless power supply apparatus 10 and the like. According to the present embodiment, the threshold BI is set to ±10% from the maximum value and the minimum value of the current.

When determined that the variation ΔI is the threshold BI or higher (No at Step S103), the control unit 60 adds a phase amount Δφ1 to the phase φ (S104). That is, the phase difference is controlled to become larger, which is therefore the phase control for the high-frequency signal oscillated in the second unit 12. When the variation ΔI is the threshold BI or higher, it is thought that the phase of the carrier clock set in the second unit 12 is outside the phase control range shown in FIG. 4. In other words, the phase difference between the carrier clock set in the first unit 11 and the carrier clock set in the second unit 12 is considered to be excessive, and stable power transmission is not being performed between the first unit 11 and the second unit 12. Therefore, the control unit 60 adjusts the phase difference between the first unit 11 and the second unit 12 by adding to the phase φ. At this time, the control unit 60 adds about 90° (=Δφ1) to the phase φ. After adjusting the phase φ at S104, the control unit 60 returns to S101 and repeats the process until the variation ΔI in the current Im becomes lower than the threshold BI.

Conversely, when determined that the variation ΔI is lower than the threshold BI (Yes at S103), the control unit 60 detects the current with the current sensor 61 and sets the detected value as a current Ib (S105). When the current Ib is detected, the control unit 60 adds a phase amount Δφ2 to the phase φ (S106). In other words, when the current Ib is detected, the control unit 60 adds a phase amount Δφ2 to the phase φ of the carrier clock in the second unit 12. For example, the control unit 60 adds a phase amount of about Δφ2=5° to the phase φ. When the addition to the phase φ has been made at Step S106, the control unit 60 detects the current I2 with the current sensor 61 again and sets the detected value as a current Ia (S107). The control unit 60 then compares the current Ib detected at S105 and the current Ia detected at S107 and determines whether or not Ia>Ib (S108). In other words, the control unit 60 determines whether or not the addition to the phase φ results in an increasing trend in the detected current Ia, in relation to the current Ib before the addition to the phase φ.

When determined that the current Ia is not greater than the current Ib at S108 (No at S108), the control unit 60 determines that the current Ta after the change to the phase φ is the previous current Ib or less, or in other words, Ia≤Ib (S109) and returns to S108. As a result, the control unit 60 repeatedly performs addition to the phase φ until the detected current Ta shows an increasing trend in relation to the current Ib before the addition to the phase φ.

Conversely, when determined that Ia>Ib at S108 (Yes at S108), the control unit 60 detects the current I2 with the current sensor 61 and sets the detected value as a current Im (S110). The control unit 60 then determines whether or not the absolute value of the difference between the current Im detected at S110 and an initial target current Is is less than an initial current error ΔIs (S111). In other words, the control unit 60 determines whether nor not |Is−Im|<ΔIs. Here, the initial target current Is corresponds to a target value of the current transmitted between the first unit 11 and the second unit 12. In addition, the initial current error ΔIs is set in advance based on the size of the current that is allowable as error. According to the present embodiment, the initial current error ΔIs is set to ±10% of the maximum value and the minimum value of the current in the phase control range.

When determined that |Is−Im| is not less than ΔIs at S111 (No at S111), the control unit 60 determines whether or not the difference between the current Im and the initial target current Is is greater than the initial current error ΔIs (S112). In other words, the control unit 60 determines whether or not Is−Im>ΔIs. When determined that Is−Im>ΔIs (Yes at S112), the control unit 60 adds a phase amount Δφ3 to the phase φ (S113). On the other hand, when determined that Is−Im>ΔIs, the control unit 60 subtracts a phase amount Δφ3 from the phase φ (S114). That is, the phase difference is controlled to become smaller. In this way, the control unit 60 finely adjusts the phase φ based on the detected current Im. For example, the control unit 60 adds Δφ3=1° to the phase φ at S113 and subtracts Δφ3=1° from the phase φ at S114.

When determined that |Is−Im|<ΔIs at S111 (Yes at S111), the control unit 60 sets the phase φ at this time as an initial phase φ0 (S115). In other words, the control unit 60 sets the phase φ set at S106, the phase φ set at S113, or the phase φ set at S114 as the initial phase φ0.

In this way, in the process from S101 to S109, the control unit 60 adjusts the phase φ so that the phase φ of the carrier clock in the second unit 12 falls within the phase control range. In addition, when the phase φ of the carrier clock of the second unit 12 falls within the phase control range, in the process from S111 to S115, the control unit 60 determines the phase φ obtained by the initial target current Is and sets the determined phase φ as an initial phase φ0.

(During Power Transmission)

When the initialization is completed, the control unit 60 performs power transmission between the first unit 11 and the second unit 12. The flow of the process performed by the control unit 60 during power transmission will be described with reference to FIG. 6.

The control unit 60 determines whether or not power is generated in the load 14 connected to the second unit 12, or in other words, whether or not regenerative power is generated (S201). When determined that regenerative power is generated (Yes at S201), the control unit 60 adds a predetermined amount of phase Δφ to the phase φ of the carrier clock in the second unit 12 (S202).

On the other hand, when determined that regenerative power is not generated (No at S201), the control unit 60 subtracts a predetermined amount of phase Δϕ from the phase ϕ of the carrier clock in the second unit 12. In other words, when power is transmitted from the first unit 11 to the second unit 12, the control unit 60 subtracts a predetermined amount of phase Δϕ from the phase ϕ of the carrier clock. On the other hand, when regenerative power generated on the second unit 12 side is transmitted from the second unit 12 to the first unit 11, the control unit 60 adds a predetermined amount of phase Δϕ to the phase ϕ of the carrier clock. Consequently, power is also transmitted from the second unit 12 to the first unit 11, in addition to from the first unit 11 to the second unit 12, as a result of the phase ϕ of the carrier clock in the second unit 12 being adjusted.

According to the first embodiment, described above, power is transmitted wirelessly at a high frequency from several megahertz to about a dozen megahertz between the pair of first unit 11 and second unit 12 using magnetic resonance. In other words, power is transmitted between the first unit 11 and the second unit 12 by wireless power supply at a high-frequency band using magnetic resonance. Therefore, size increase of the resonant coil 22 and the resonant coil 42 can be avoided, and side reduction of peripheral equipment can be achieved as well. In addition, through wireless power supply using magnetic resonance, transmission efficiency can be increased, compared to electromagnetic induction.

In addition, according to the first embodiment, the phase control unit 62 of the second unit 21 controls the phase ϕ of the carrier clock that drives the switching element 44 based on the current I2 detected by the current sensor 61. The size of power that is transmitted between the first unit 11 and the second unit 11 changes as a result of phase difference in the resonating high frequencies. Therefore, regarding the power transmitted between the first unit 11 and the second unit 12, transmission efficiency is controlled simply by controlling the phase ϕ in the second unit 12, while maintaining the phase of the high-frequency signal oscillated from the first unit 11. In other words, by controlling the phase ϕ in the second unit 12, the phase difference in the high frequencies between the first unit 11 and the second unit 12 can be controlled. As a result, the transmission efficiency of power transmitted between the first unit 11 and the second unit 12 is easily controlled. Therefore, size reduction and improvement in transmission efficiency can be achieved with a simple structure.

In addition, according to the first embodiment, when a phase difference occurs between the first unit 11 and the second unit 12, the phase difference merely causes increase in impedance in the resonant coil 22 of the first unit 11 or the resonant coil 42 of the second unit 12. In other words, even when a phase difference that causes significant reduction in transmission efficiency occurs, all that occurs is an increase in electrical resistance in the resonant amplifier circuit 21 of the first unit 11 or the resonant amplifier circuit 41 of the second unit 12, and unintended flow of current and flow of excessive current do not occur. Therefore, even when large power is transmitted between the first unit 11 and the second unit 12, safety can be improved.

According to the first embodiment, as a result of the phase difference between the first unit 11 and the second unit 12 being produced by controlling the phase ϕ of the carrier clock that drives the switching element 44, the transmission direction is controlled in addition to power transmission efficiency by the phase difference. As a result, power generated by regeneration in the load 14 connected to the second unit 12 is transmitted from the second unit 12 to the first unit 11. Consequently, the energy that is generated in the load 14 connected to the second unit 12 is transmitted to another load via the first unit 11. Therefore, power can be transmitted bi-directionally between the first unit 11 and the second unit 12 by a simple control operation in which the phase ϕ of the carrier clock in the second unit 12 is controlled, and power consumption of the overall equipment can be achieved.

According to the first embodiment, the resonant coil 22 of the first unit 11 and the resonant coil 42 of the second unit 12 both function as resonant inductors of the resonant amplifier circuit 21 and the resonant amplifier circuit 41. Therefore, resonant inductors are not required to be separately provided in the resonant amplifier circuits 21 and 41. Therefore, simplification of circuit configuration can be achieved and size reduction of equipment can be promoted.

Second Embodiment

Figure 7:
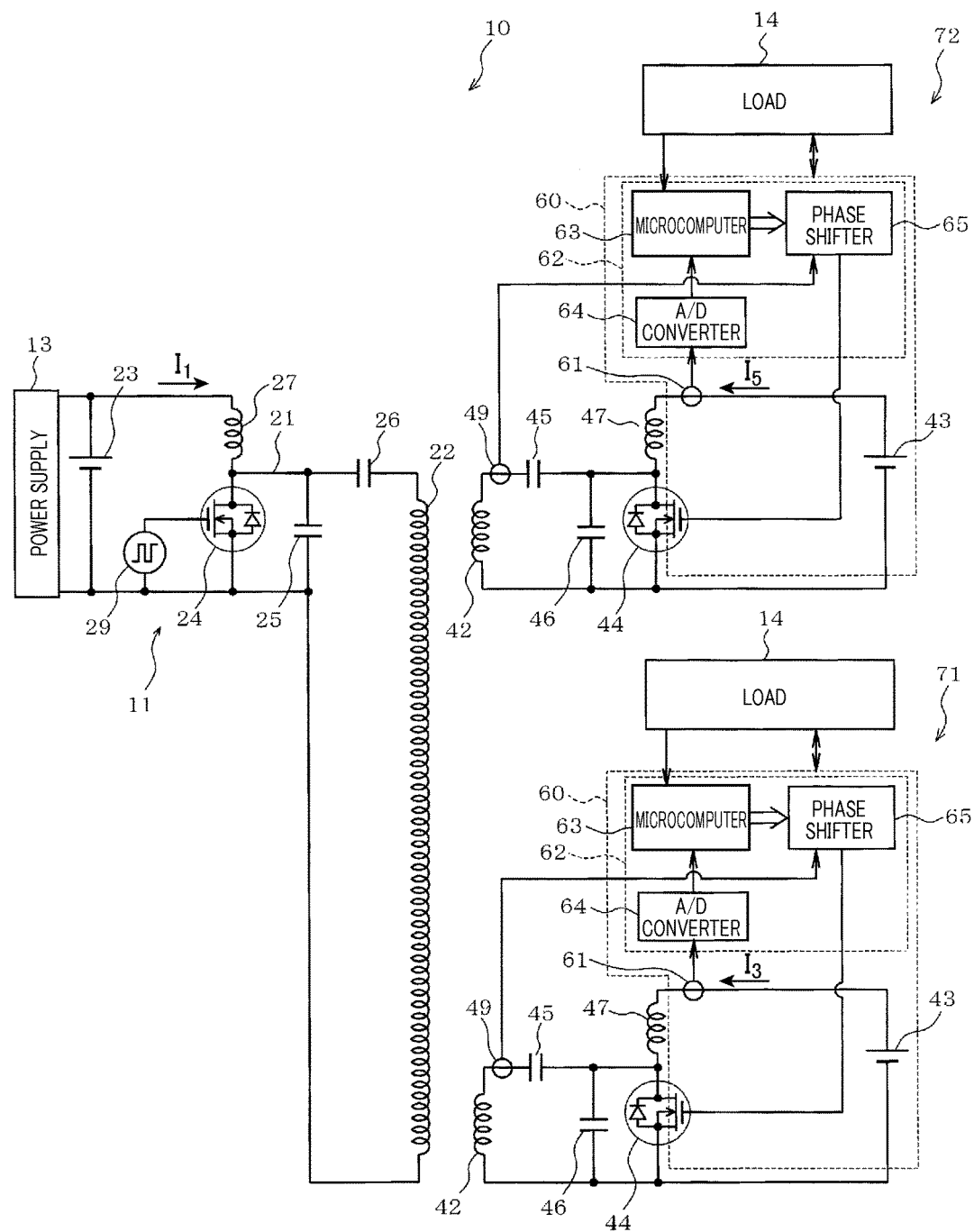
FIG. 7 is a schematic diagram of an electrical configuration of a wireless power supply apparatus according to a second embodiment.

A wireless power supply apparatus according to a second embodiment is shown in FIG. 7.

In the second and subsequent embodiments, the components functionally or in structures equivalent or similar to those explained in the first embodiment will be given the same reference numbers and omitted from being explained in detail for avoiding redundant explanations.

The wireless power supply apparatus 10 according to the second embodiment is an example in which two second units 71 and 72 are provided in relation to a single first unit 11. The second unit 71 and the second unit 72 both have the same structure. In this case, in addition to transmission of power between the first unit 11 and the second unit 71 and between the first unit 11 and the second unit 72, power can also be transmitted between the second unit 71 and the second unit 72 with the first unit 11 serving as a relay.

Figure 8A:
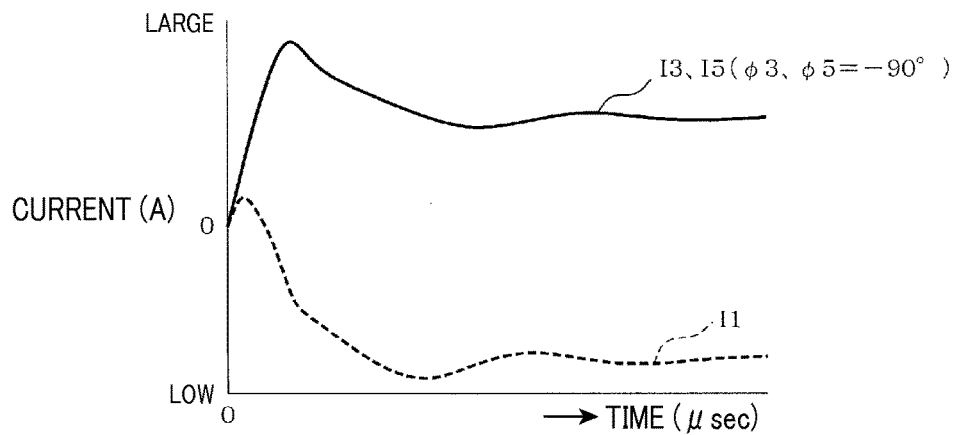
FIGS. 8A-8C are schematic diagrams of the changes in current in the wireless power supply apparatus according to the second embodiment.
Figure 8B:
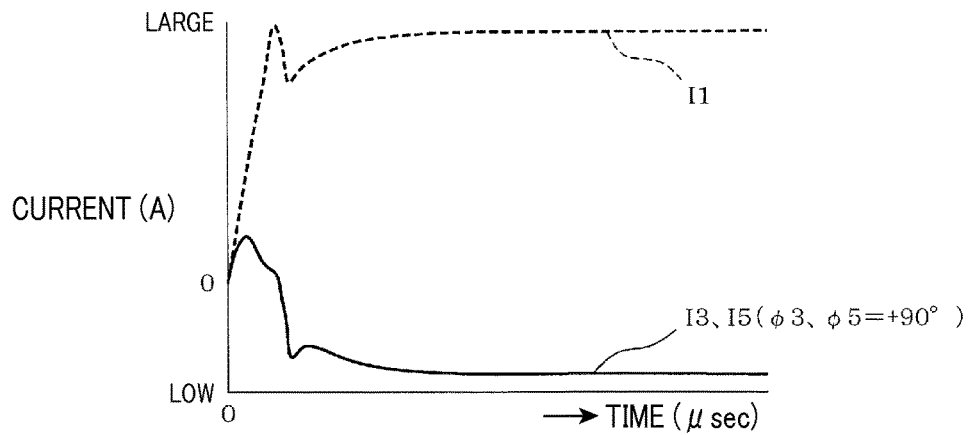
Figure 8C:
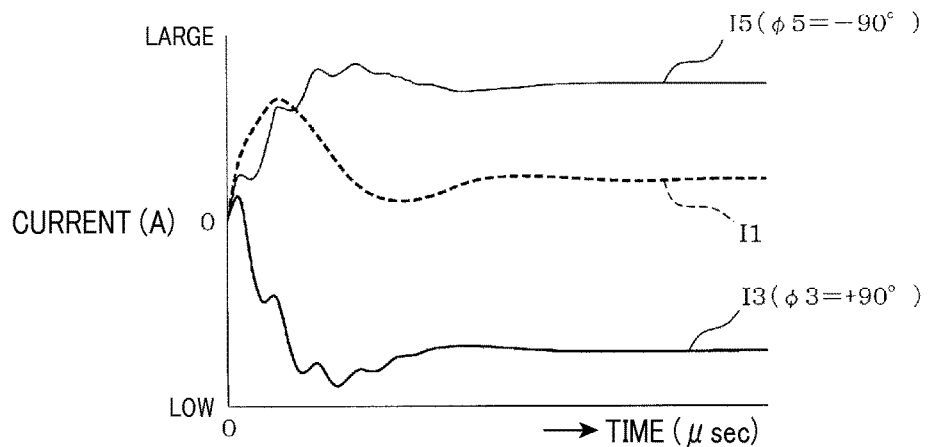

FIG. 8 shows the results of tests conducted using the wireless power supply apparatus 10 shown in FIG. 7. The current flowing through the first unit 11 is IL the current flowing through the second unit 71 is I3, and the current flowing through the second unit 72 is I5. In addition, the phase of the carrier clock in the second unit 71 is ϕ3 and the phase of the carrier clock in the second unit 72 is ϕ5. FIG. 8A shows an operation pattern 1 in which power is transmitted from the second unit 71 and the second unit 72 to the first unit 11. At this time, the phase ϕ3 of the second unit 71 and the phase ϕ5 of the second unit 72 are respectively set to ϕ3=−90° and ϕ5=−90°. FIG. 8B shows an operation pattern 2 in which power is transmitted from the first unit 11 to the second unit 71 and the second unit 72. At this time, the phase ϕ3 of the second unit 71 and the phase ϕ5 of the second unit 72 are respectively set to ϕ3=+90° and ϕ5=+90°. FIG. 8C shows an operation pattern 3 in which power is transmitted from the second unit 71 to the second unit 72 via the first unit 11. At this time, the phase ϕ3 of the second unit 71 is set to +90° and the phase ϕ5 of the second unit 72 is set to −90°. As the operation pattern 3 indicates, it is clear that power can be transmitted from the second unit 71 to the second unit 72 via the first unit 11.

According to the second embodiment, as a result of the first unit 11 serving as a relay, power generated by regeneration in the load 14 connected to the second unit 71 is transmitted to the other second unit 72 that opposes the first unit 11. The reverse, or in other words, power transmission from the second unit 72 to the second unit 71 is also similarly performed. Therefore, power can be interchanged between the loads 14 connected to the plurality of second units 71 and 72.

Third Embodiment

A wireless power supply apparatus according to a third embodiment is shown in FIGS. 9A and 9B and FIGS. 10A and 10B.

Figure 9A:
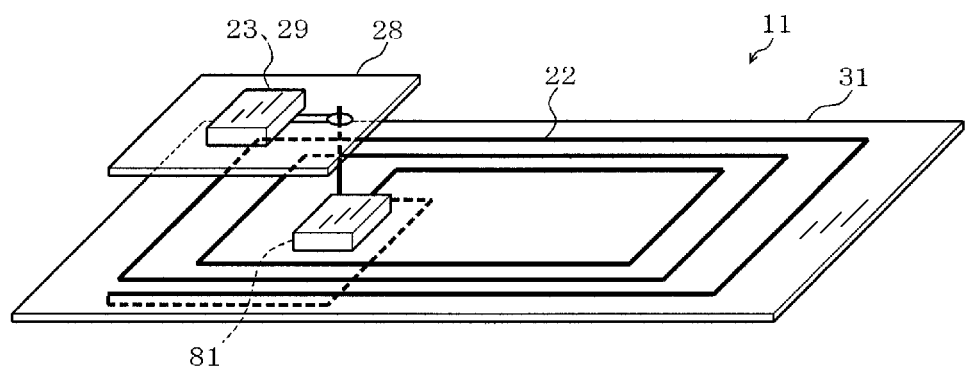
Figure 9B:
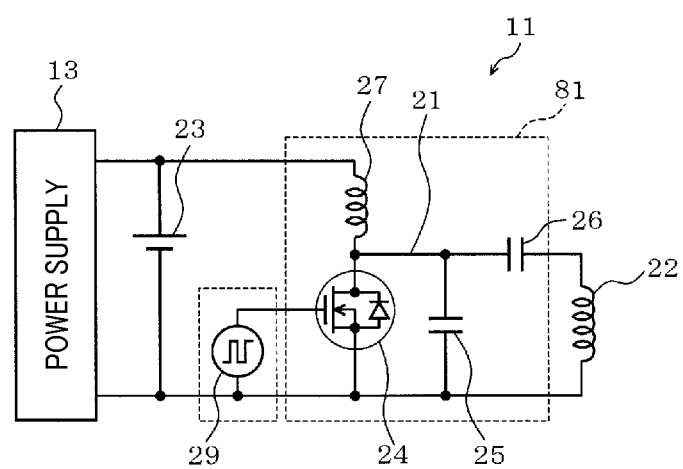
Figure 10A:
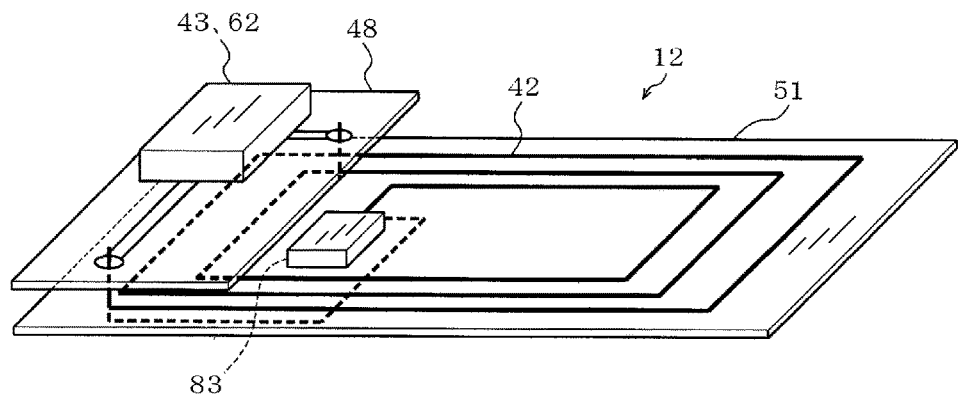
Figure 10B:
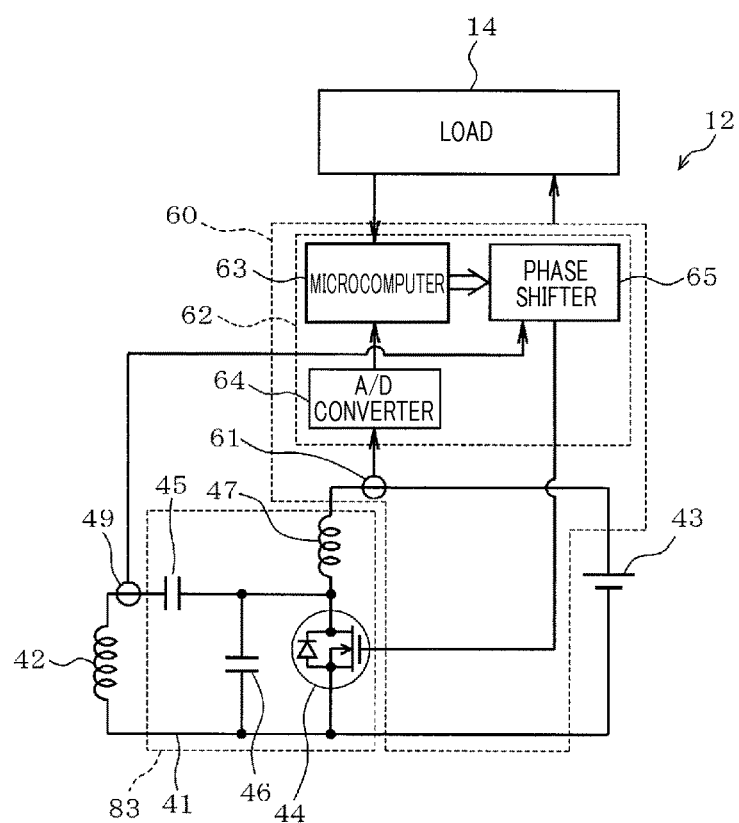

According to the third embodiment, as shown in FIGS. 9A and 9B, in the first unit 11, a power converting unit 81 that is composed of the switching element 24, the capacitor 25, the capacitor 26, and the coil 27 is mounted on the substrate 31 on which the resonant coil 22 is formed. The clock generating unit 29 that generates the carrier clock is mounted on an amplifier board unit 83 that is separate from the substrate 31. The electric storage unit 23 of the first unit 11 is provided in the amplifier board unit 48 together with the clock generating unit 29. Meanwhile, as shown in FIGS. 10A and 10B, in the second unit 12, a power converting unit 83 that is composed of the switching element 44, the capacitor 45, the capacitor 46, and the coil 47 is mounted on the substrate 51 on which the resonant coil 42 is formed. The control unit 60 is mounted on the amplifier board unit 48 that is separate from the substrate 51. The electric storage unit 43 of the second unit 12 is provided in the amplifier board unit 48 together with the control unit 60 and the like.

According to the third embodiment, in the first unit 11, the switching element 24 that generates the high-frequency signal at high power in the first unit 11 is provided in the amplifier board unit 28 that is separate from the substrate 31 on which the resonant coil 22 is formed. In a similar manner, in the second unit 12, the switching element 44 that generates the high-frequency signal of the large power in the second unit 12 is provided in the amplifier board unit 48 that is separate from the substrate 51 on which the resonant coil 22 is formed. As a result, the switching element 24 and the switching element 44 are provided on substrates that are separate from the resonant coil 22 and the resonant coil 42 that oscillate at high frequencies. Therefore, shielding of the amplifier board unit 28 and the amplifier board unit 48 from high frequencies can be facilitated and noise reduction can be facilitated.

Fourth Embodiment

Figure 11:
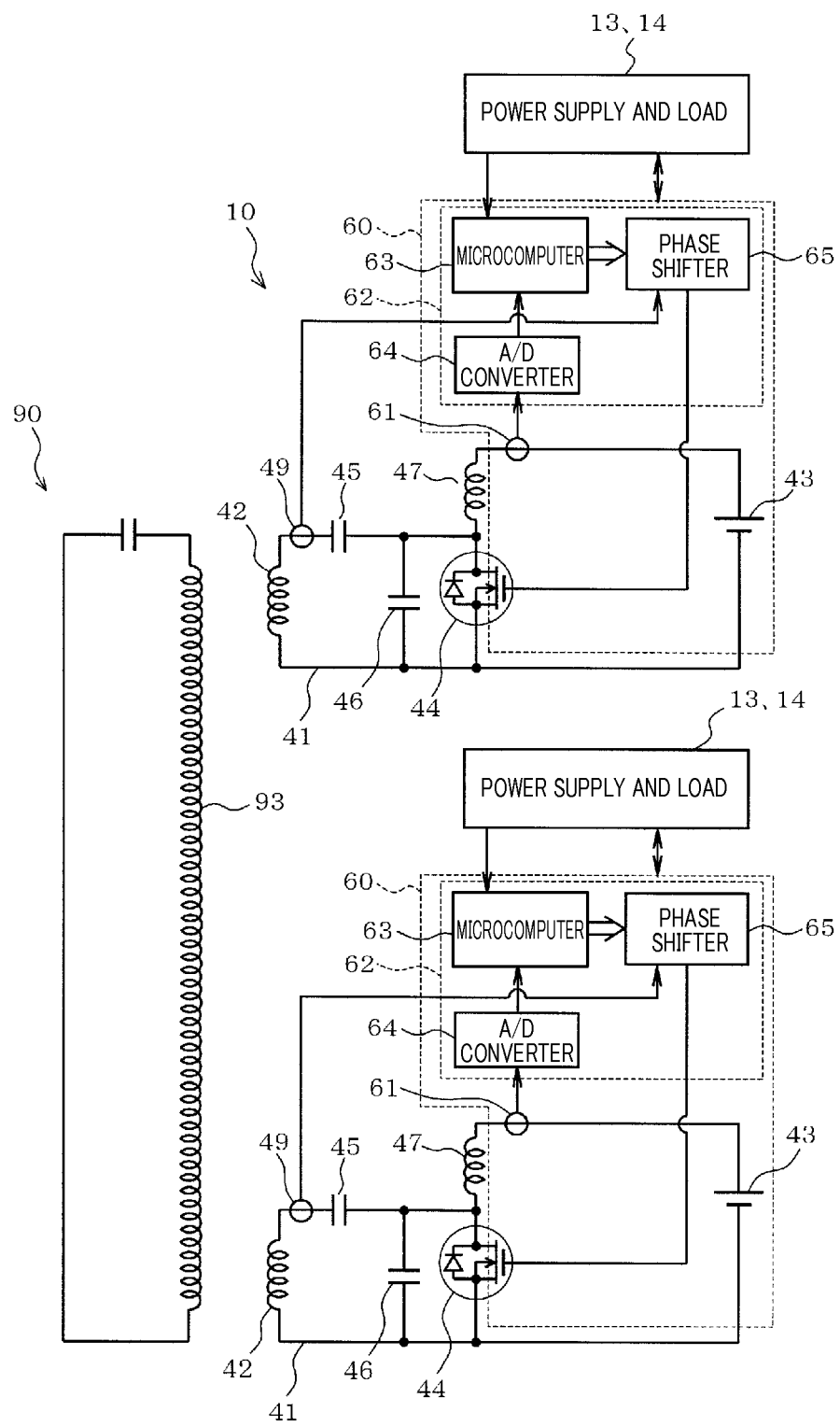
FIG. 11 is a schematic diagram of an electrical configuration of a wireless power supply apparatus according to a fourth embodiment.

A wireless power supply apparatus according to a fourth embodiment is shown in FIG. 11.

According to the fourth embodiment, two coil units, a coil unit 91 and a coil unit 92, that oppose a resonant coil board 90 are provided. The resonant coil board 90 is provided so as to oppose both of the two coil units 91 and 92. In the instance of the wireless power supply apparatus 10 that uses high frequencies, a resonant coil 93 that does not consume power functions as a transmission path for transmitting power. According to the fourth embodiment, the two coil units 91 and 92 are connected to at least either of the power supply 13 and the load 14. As a result, the two coil units 91 and 92 both function as the first unit and the second unit. In other words, according to the fourth embodiment, when the coil unit 91 transmits power that is lacking to the other coil unit 92, the coil unit 91 functions as the first unit and the coil unit 92 functions as the second unit. In addition, when the coil unit 92 transmits power that is lacking to the other coil unit 91, the coil unit 92 functions as the first unit and the coil unit 91 functions as the second unit.

In addition, according to the fourth embodiment, the two coil units 91 and 92 share a similar electrical structure as that of the second unit 12 according to the first embodiment. In other words, according to the fourth embodiment, the coil units 91 and 92 both function as the first unit or the second unit. Therefore, the coil units 91 and 92 share the structure of the more structurally complex second unit. Here, in FIG. 11, the coil units 91 and 92 are given the same reference numbers as the second unit.

As described above, according to the fourth embodiment, as a result of the coil units 91 and 92 sharing the same configuration using the resonant coil 93 formed on the resonant coil board 90, bi-directional power transmission can be performed.

The present invention described above is not limited to the above-described embodiments and can be applied to various embodiments without departing from the spirit thereof.

What is claimed is:

1. A wireless power supply apparatus comprising:
   a first unit electrically connected to a power supply; and
   a second unit electrically connected to an electric load and configured to instruct power transmission wirelessly between the first and second units based on a magnetic resonance phenomenon caused between the first and second units, wherein
   the first unit and the second unit each comprise i) a resonant amplifier circuit provided with a switching element driven by a carrier clock, ii) a resonant coil to which a high-frequency signal generated by the resonant amplifier circuit is supplied such that the resonant coil functions as a resonant inductor in the resonant amplifier circuit, and iii) an electric storage electrically connected to the resonant amplifier circuit so as to be capable of charging and discharging power; and
   the second unit includes:
     a first current detector that detects a current flowing through an electric path electrically connecting the resonant amplifier circuit and the electric storage,
     a second current detector that detects a current through the resonant coil in the second unit,
     a phase adjusting device that adjusts a phase of the carrier clock applied to the switching element of the second unit on the basis of fluctuations in the current detected by the first current detector, such that the phase of the carrier clock falls within a preset controllable range of the phase, the preset controllable range including a phase which prevents fluctuation in a characteristic of the high-frequency signal caused by a difference between electronic characteristics of the first and second units,
     an initial phase setting device that sets an initial phase on the basis of the current detected by the first current detector when the phase of the carrier clock in the second unit has fallen within the controllable range, the initial phase being based on an initial target current (Is) which is an initial target value of current transmitted between the first unit and the second unit, and
     a phase control device that controls the phase of the carrier clock applied to the switching element of the second unit on the basis of the current detected by the second current detector after the initial phase has been set by the initial phase setting device, wherein during control of the phase of the clock carrier, the phase of the high-frequency signal is fixed at a given value.

2. The wireless power supply apparatus according to claim 1, wherein the phase control device is configured to control an efficiency of the power transmission as well as the phase of the carrier clock applied to the switching element such that the power is transmitted bi-directionally from the first unit to the second unit and from the second unit to the first unit.

3. The wireless power supply apparatus according to claim 2, wherein the second unit comprises two second units electrically connected in parallel to the first unit, in which the two second units have the same structure in terms of the resonant amplifier circuit, the resonant coil, the first and second current detectors, the phase adjusting device, the initial phase setting device, and the phase control device.

* * * * *